March 8, 1955  D. J. POMPEO ET AL  2,703,628
AUTOMATIC GAS DRYING APPARATUS

Filed Dec. 27, 1952  2 Sheets-Sheet 1

Inventors: G. W. Noller
C. J. Penther
D. J. Pompeo
By J. H. McCarthy
Their Agent Inventors: G.W. Noller
C.J. Penther
D.J. Pompeo
By A.H. McCarthy
Their Agent

United States Patent Office 2,703,628
Patented Mar. 8, 1955

2,703,628

AUTOMATIC GAS DRYING APPARATUS

Domenick J. Pompeo and Carl J. Penther, Oakland, and George W. Noller, Berkeley, Calif., assignors to Shell Development Company, Emeryville, Calif., a corporation of Delaware Application December 27, 1952, Serial No. 328,216

8 Claims. (Cl. 183—4.1)

This invention relates to apparatus for drying gases and pertains more particularly to a two-unit apparatus for removing moisture from gases, said apparatus being adapted to regenerate one of said units while the other unit is drying the gas.

Many chemical manufacturing operations require large amounts of dry air or other gases. For example, ammonia synthesis plants require large volumes of air and hydrocarbon gases dried to exceedingly low moisture content (less than 1 p. p. m.). If air containing moisture in amounts greater than 1 p. p. m. passes the dryer outlet to the liquefaction system, moisture accumulates and freezes at critical points, thereby clogging orifices and valves. In such cases, a shut-down of the plant is necessary to remove the accumulated water, resulting in lost production which may amount to thousands of dollars.

At present, the drying of air or other gases is readily accomplished by the use of commercial or specially built dryers which contain a desiccant. When a dryer is filled with fresh desiccant and when the operations are normal, the effective drying period of a dryer may be readily determined by experiment. Thus, for example, it may be known that with fresh desiccant and normal operations, moist air may be passed through a dryer for fifteen hours before the desiccant becomes saturated to the extent that it no longer removes moisture from the air. It may be seen, however, that in the event of a sudden leak in heat exchanger coils, the condition of the desiccant in the dryer could only be determined by repeated analysis of the air being discharged from the dryer.

Present methods of determining the moisture content of the air are both time consuming and inaccurate. For example, when using phosphorus pentoxide as the absorbent, the test takes four hours. Alternatively, when metering air through a liquid nitrogen trap and weighing the moisture trapped therein, the test takes at least one hour, and has been found to be inaccurate. A further problem arises in determining the life of a dryer in that there is a gradual deterioration of the desiccant from contaminants carried by the gas passing therethrough, particularly during period of production in excess of the rated capacity.

It is, therefore, an object of this invention to provide a gas drying apparatus designed to permit the continuous regeneration of a portion of the desiccant contained therein while at the same time permitting a continuous removal of moisture from a gas by the other portion of desiccant.

A further object of this invention is to provide a two-unit gas-drying apparatus including means for determining the moisture content of the desiccant in both units.

Another object of this invention is to provide a two-unit gas-drying apparatus wherein gas is dried by the desiccant in one unit while the desiccant in the second unit is being regenerated, said apparatus being adapted to change the flow of moist air and channel it through the regenerated unit when the moisture removal capacity of the other unit has decreased to an undesirable value.

A further object of this invention is to provide a two-unit gas-drying apparatus provided with means for indicating the decreasing drying efficiency of the unit in which the gas is being dried and indicating the increasing efficiency of the unit being regenerated.

Still another object of this invention is to provide a gas-drying apparatus having means for indicating the condition of the desiccant within the apparatus when said desiccant becomes substantially saturated or has been completely regenerated, without the necessity of running moisture determinations on the effluent air from the apparatus.

Another object of this invention is to provide a drying apparatus containing a desiccant for absorbing moisture from gases passed therethrough, said apparatus being provided with means for indicating the point at which the desiccant becomes substantially saturated or completely regenerated, said moisture indication being a true indication of the drying capacity of the desiccant regardless of the degree to which the desiccant has become contaminated with other products.

These and other objects of this invention will be understood from the following description taken with reference to the drawing, wherein.

Figure 1:
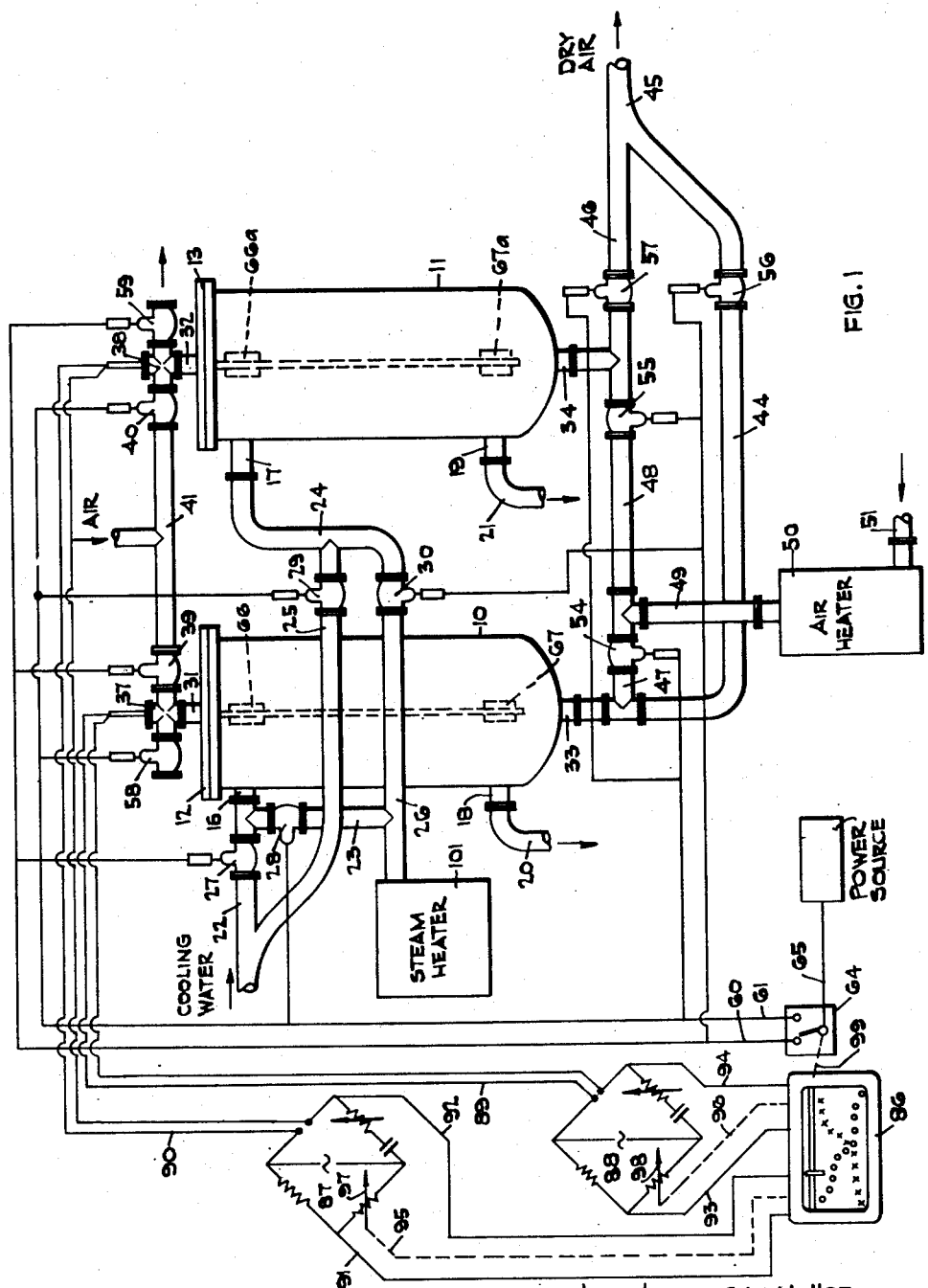
Figure 1 is a schematic diagram illustrating the principal component parts of the present automatic gas-drying apparatus.

Referring to Figure 1 of the drawing, the present gas-drying equipment comprises a pair of vessels or tanks 10 and 11 closed at the top in any suitable manner as by covers 12 and 13. As shown in more detail in Figure 2 of the drawing, each tank 10 or 11 is filled with numerous coils. Fixedly secured to the coils at various positions throughout the tank are a plurality of baffles or fins. Preferably, the baffles are in the form of thin metallic fins or plates which are welded to the outer surface of the coils. The baffles are tilted at various angles so as to cause a flow of air through the tank 10 to follow a tortuous path. Baffles may also be secured to the inner surface of the tank 10 if desired, but are preferably secured to the coils in order to increase the effective heating surface of the coils when steam is passed therethrough. For ease of illustration, the coils 14 and the baffles 15 have been drawn oversize and greatly out of proportion. Actually, in one installation, a vessel about 10 feet high and 3 feet in diameter is employed, which is filled with one-inch coils wound on 2 inch centers. The spaces between the coils are filled with a desiccant such, for example, as alumina or bauxite.

The inlet ends 16 and 17 (Figure 1) of the coils extend through the wall of the vessels 10 and 11. In a like manner, the discharge ends 18 and 19 of the coils extend through the wall of the vessels at the lower ends thereof, and are connected to suitable conduits 20 and 21 for discharging fluids therefrom. The inlet end of the coil 16 in vessel 10 is connected by means of conduit 22 to a source of cooling water and by means of conduit 23 to a steam heater or other apparatus for supplying hot fluid to the coils. Similarly, the inlet nozzle 17 of the coil in vessel 11 is in communication with the source of cooling water through conduits 24 and 25 and in communication with the steam heater through conduits 24 and 26. The conduits 22, 23, 25 and 26 are provided with valves 27, 28, 29 and 30 respectively, for controlling the flow of fluid therethrough. By opening and closing the required valves, the cooling coils in one vessel 10 may be connected to the source of cooling water at the same time that the coils in the other vessel 11 are connected to the steam heater. The valves employed in the system may be either hand-operated or power-operated, such as electric, hydraulic or pneumatic type valves.

The vessels 10 and 11 are further provided with inlet nozzles 31 and 32, and discharge nozzles 33 and 34, respectively. The inlet nozzles 31 and 32 are connected through suitable T's or crosses 37 and 38, and valves 39 and 40 to an air manifold 41. The air manifold 41, in turn, may be connected to a suitable source of pressure air, such as a compressor (not shown). The discharge nozzle 33 of vessel 10 is connected by means of conduit 44 to the main discharge conduit 45. In a like manner, discharge nozzle 34 of vessel 11 is connected by means of conduit 46 to the main discharge conduit 45. Preferably, a screen 109 is placed across the discharge conduits 33 and 34 to prevent the loss of desiccant from the vessels 10 and 11. The discharge conduits 33 and 34 are also in communication through conduits 47 and 48, respectively, and conduit 49, with an air heater 50. The air heater 50 may be of any desired type, and is provided with an air inlet 51. The flow of air through conduits 44, 46, 47 and 48 is controlled by means of valves 54, 55, 56, and 57. Like other valves in this apparatus, these valves 54, 55, 56 and 57 may be either manually operated or power operated.

The two crosses 37 and 38 connected to the inlet nozzles 31 and 32 of the tanks 10 and 11 are also provided with valves 58 and 59, through which air may be discharged from the vessels 10 and 11. In the event that power-operated valves are used throughout this apparatus, all of the valves are connected through auxiliary power transmission lines to one or two power transmission lines 60 or 61, which may comprise a two-lead electric cable or pressure tubing for transmitting a pressure fluid. In a two-vessel system, as illustrated in Figure 1, half of the valves are connected to one power transmission line 60 and the other half to the other power transmission line 61. Switch means 64 are provided whereby half the valves may be switched from an open to a closed position, while the other half of the valves are switched from a closed to an open position. If the valves employed are electrically-actuated valves, such as motor-driven valves or solenoid valves, then the switch means 64 is an electrical selector switch adapted to connect either line 60 or 61 to a suitable source of power obtained through cable 65. If, on the other hand, pneumatic or hydraulic valves were employed, the switch means 64 would take the form of a two-way valve in the pneumatic or hydraulic power lines 60 and 61. Thus, by switching the valve from one position to another, power fluid would be supplied to one-half of the valves or the other half.

Figure 2:
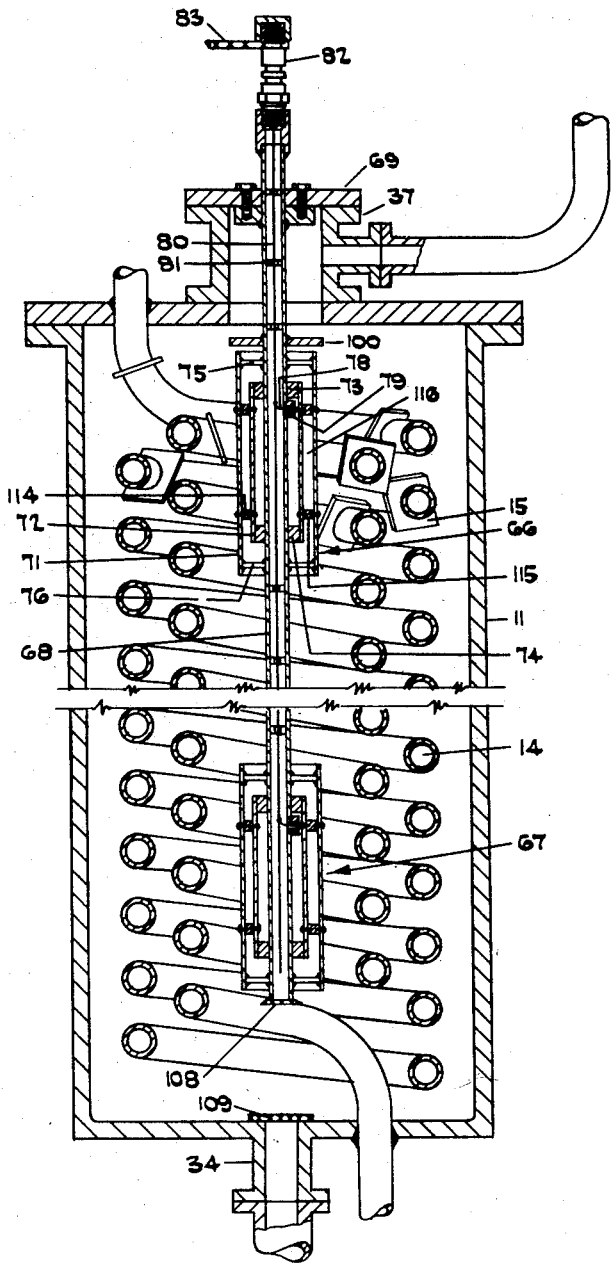
Figure 2 is a cross-sectional view in front elevation of one drying chamber of the present gas-drying apparatus.

Each vessel 10 and 11 is provided with means, near the top and bottom thereof, for determining the moisture content or the degree of saturation of the desiccant within the vessel. As shown in Figure 2 of the drawing, the moisture-indicating devices comprise a pair of capacitors or capacity cells 66 and 67 fixedly mounted on a steel pipe, which is centrally positioned in the vessel. The pipe 68 may be suspended from a cover plate 69 which closes the T 37 at the top of the vessel in a fluid tight manner. If desired the bottom of pipe 68 may be closed as by a plate or screen 108.

Each of the capacity cells 66 and 67 comprises a pair of concentric tubular cylindrical elements 71 and 72 which form the electrodes of the capacity cell. The inner electrode 72 is secured to the pipe 68 by means of bushings 73 and 74 which are made of an electrical-insulating material. The outer electrode 71 is secured to the pipe by means of steel connecting pins 75 and 76 at the top and bottom of said electrode. If desired, small spacing elements 114 and 115 may be inserted between the two electrodes 71 and 72 and secured thereto, whereby the spacing between the two electrodes is positively fixed. The top and bottom of the capacity cell are open, thereby allowing desiccant contained in the vessel 10 to fill the annular space 116 between the two electrodes 71 and 72. The inner electrode 72 is electrically connected by means of a lead 78 which passes through an insulation plug 79 in the wall of pipe 68 and connects with an electrical lead 80, which is suspended in the center of the pipe. This lead 80 may be an insulated conductor or a bare conductor which is spaced from the walls of the pipe by insulation washers 81. The electrical lead 80 may terminate at any aviation-type spark plug 82 or any other suitable pressure-type insulated connector which is positioned in and closes the upper end of pipe 68. A shielded conductor or a multiple-lead conductor 83 may be employed to conduct the capacity signals away from the spark plug 82. The outer electrode 71 is connected to ground through steel connecting pins 75 and 76, the pipe 68, spark plug 82 and shielded conductor 83, while the inner electrode 72 is connected by electrical leads 78 and 80, spark plug 82 and conductor 83 to any suitable type of capacity indicating means such, for example, as a capacity bridge as shown in Figure 1 of the drawing. While the two capacity cells 66 and 67 are shown as being connected in parallel, it is realized that the apparatus of the present invention will operate in an efficient manner if the capacity cells 66 and 67 are connected in series, or are separately connected to a suitable recorder.

As shown in Figure 1, capacity cells 66 and 67 in vessel 10 and the capacity cells 66a and 67a in vessel 11 are connected to a recorder-controller unit 86 adapted to trace or print a dielectric-constant curve for each pair of capacity cells. The controller-recorder unit 86 is provided with a pair of bridges 87 and 88, which are either built into the unit 86 or are positioned adjacent the unit and electrically connected thereto for measuring the capacitance, dielectric loss or resistance of cells. The capacity cells 66 and 67 of vessel 10 are connected as by a shielded wire 89 to the capacitance bridge 88 and forms one arm thereof, while the capacity cells 66a and 67a are connected by lead 90 to form one arm of the capacitance bridge 87. The bridges 87 and 88 are electrically connected to the recorder controller unit 86 by the electrical leads 91, 92, 93 and 94. The broken lines 95 and 96 represent mechanical connections between the recorder-controller unit and the variable resistances 97 and 98 which form the balancing arms of the bridges 87 and 88. The broken line 99 represents a mechanical transmission line between the recorder controller unit 86 and the switch or valve 64 whereby the recorder-controller unit 86 is adapted to actuate the switch 64, thereby energizing either line 60 or line 61 leading therefrom.

The present apparatus is employed to dry air or other gases to exceedingly low moisture contents, for example, less than one part per million. Using vessels 10 and 11 which are about 10 feet high and 3 feet in diameter, large quantities of gas, for example, 500,000 cubic feet per hour, may be efficiently dried. In operation, the air to be dried is let in through manifold 41 to one of the vessels, say, vessel 11, where it is passed through the desiccant contained therein and then discharged through valve 57 in conduits 46 and 45. While vessel 11 is on its drying cycle and the gas being passed therethrough is being dried, the other vessel 10 is on its regeneration cycle. During the drying cycle, air enters the top of the vessel (Figure 2) and is baffled throughout its entire trip through the vessel by means of the fin-like baffles 15 secured to the coils. Additionally, other baffles, for example, baffle 100, may be secured to the central pipe 68 in the vessel. The baffles 15 are arranged so that the desiccant contained in the upper portion of the vessel adsorbs the moisture from the gas passing through the vessel. As the desiccant in the upper portion of the vessel becomes substantially saturated, portions of the desiccant contained in the lower sections of the vessel adsorb the water or other liquid from the gas. Due to the baffling of the air flow, there is a relatively distinct division line between the substantially saturated desiccant near the upper part of the vessel and the dry desiccant in the lower part of the vessel. Thus, during drying operation, there is a moving "wet front," lying in a substantially horizontal plane, which moves downwardly through the vessel throughout its drying cycle.

As the "wet front" passes down through the desiccant, it also moves down through the desiccant contained in the annular space 116 of the upper capacity cell 66, thereby causing the dielectric constant of the desiccant between electrodes 71 and 72 to change. This change in dielectric constant is recorded on the recorder-controller unit 86. As the "wet front" between the saturated and unsaturated portions of the desiccant continues to move downwardly through the vessel, it approaches and moves past the second capacity cell 67. The change in the dielectric constant of the desiccant contained within the lower capacity cell 67 is also recorded on the recorder-controller unit 86. As the second capacity cell 67 is located near the bottom of the vessel, this is an indication that the drying capacity of the desiccant therein is substantially exhausted. Thus, when the second increase in dielectric constant recording takes place on the recording unit 86, the switch means 64 is mechanically actuated by the recorder-controller unit 86, thereby de-energizing the transmission conduit 60 and energizing the transmission conduit 61.

Assuming, for example, that the valves employed in the present apparatus are electrically-actuated solenoid valves, when vessel 11 is on its drying cycle valves 40 and 57 are open to allow the passage of air through said vessel. Additionally, valve 29 in the cooling water conduit 25 is open to allow the passage of cooling water through the coils to remove the heat of adsorption. At the time that vessel 11 is on its drying cycle, vessel 10 is on its regeneration cycle. During the regeneration of the desiccant within the vessel 10, valve 27 in the cooling water conduit 22 is closed, thereby shutting off the water supply to the coils in the vessel and valve 28 in conduit 23 from the steam heater is open, thereby allowing steam to pass through the coils and be discharged therefrom through nozzle 18 and conduit 20. As steam is being passed through the coils, hot air is forced from air heater 50 through conduit 49 and open valve 54, up through the desiccant contained in the vessel 10. The baffles 15 contained in the coils 14 thereof again effectively baffle the flow of hot air so that there is a substantially horizontal "wet front" moving upwardly through the desiccant in the vessel as the moisture contained therein is driven up through the vessel to be discharged through nozzle 31, cross 37 and open valve 58. The recorder controller unit 86, which is of the two-pen type, records the change in dielectric constant of the desiccant within the lower capacity cell 67 as the surrounding desiccant in the vessel is dried. When the entire vessel of desiccant is dried, the recorder 86 will so indicate due to the change in dielectric constant of the desiccant within the upper capacity cell 66.

By controlling the amount of hot air fed from the air heater 50 into the vessel 10 during the regeneration cycle, the length of time that it takes to regenerate the desiccant within the vessel 10 may be selected to be substantially equal to the time that it takes the desiccant in the other vessel 11 to become substantially saturated. However, if desired, it is realized that the recorder controller may be connected to cut off the hot air supply to the vessel being regenerated upon a change in the dielectric constant of the desiccant within the upper capacity cell 66.

In one system in which the present apparatus may be used, bauxite rather than alumina may be used as a desiccant to dry 500,000 cubic feet per hour of gas after it has passed through various scrubbers and absorbers. In spite of all efforts to remove all components of low volatility, traces of heavy carbon material gradually accumulate on the bauxite, lowering its effectiveness. Not only is the total water picked up by the contaminated desiccant less, but the rate of absorption is only about one half that of fresh desiccant. The marked difference between the dielectric constant of fresh and contaminated bauxite makes it possible to monitor not only each drying and regenerating cycle in the present drying apparatus, but also to follow the contamination of the bauxite so that replacement can be made before failure and expensive shut down results.

Where a continuous stream of dry gas is not needed, it is only necessary to use one vessel 11 of the two-unit drying system shown in Figure 1, together with one nozzle 87 and the air heater 50. After air passes from manifold 41 through vessel 11 for a predetermined period, approximately 8 hours, or until the capacity cell 67a and its recorder 86 indicate that the desiccant in the vessel is saturated, valve 40 would be closed to stop the flow of wet air while valves 55 and 59 would be opened so that hot dry air could be forced through the vessel to regenerate the desiccant.

We claim as our invention:

1. A gas drying apparatus comprising a closed vessel, fluid circulation tubes mounted within said vessel, the inlet and outlet ends of said tubes extending through the walls of said vessel said inlet ends being adapted to be connected to a source of heat transfer fluid, a gas inlet conduit extending through the wall of said vessel and in communication with a gas supply, a gas discharge conduit extending through the walls of said vessel for discharging gas therefrom, said vessel being substantially filled with a desiccant capable of absorbing water from the gas as it flows through said vessel, moisture detecting capacity cells filled with said desiccant and mounted within the vessel near the top and bottom thereof, indicating means electrically connected to said moisture detecting capacity cells, and desiccant regeneration means in communication with said vessel and responsive to a signal from said moisture detecting capacity cells for regenerating the desiccant in said vessel.

2. A gas drying apparatus comprising a closed vessel, circulation tubes mounted within said vessel, the inlet and outlet ends of said tubes extending through the walls of said vessels, said circulation tubes being adapted to communicate alternately with a source of cooling fluid as a gas is being dried and a source of heating fluid for subsequent regeneration, a gas inlet conduit extending through the walls of said vessel and in communication with a gas supply, a gas discharge conduit extending through the walls of said vessel for discharging dry gas therefrom, said vessel being adapted to be substantially filled with a desiccant for absorbing water from the gas as it flows through said vessel, baffle means affixed to said cooling tubes within each vessel for directing the flow of gas in a tortuous path through said vessel, moisture detecting capacity cells filled with said desiccant and mounted within said vessel near the top and bottom thereof, indicating means electrically connected to said capacity cells, air heater means in communication with said gas discharge conduit of said vessel, and valve means in said gas inlet and outlet conduits and responsive to a signal from said moisture detecting capacity cells for alternately connecting the vessel with said gas supply and said air heater means.

3. A multiple-unit automatic regenerative gas drying apparatus comprising two closed vessels, circulation tubes mounted within each of said vessels, the inlet and outlet ends of said tubes extending through the walls of said vessels, said circulation tubes being adapted to communicate alternately with a source of cooling fluid as a gas is being dried and a source of heating fluid for subsequent regeneration, gas inlet conduit means extending through the walls of said vessels and in communication with a gas supply, gas discharge conduit means extending through the walls of said vessels for discharging gas therefrom, said vessels being substantially filled with a desiccant capable of absorbing water from the gas as it flows through said vessels, moisture detecting capacity cells filled with said desiccant and mounted within each vessel near the top and bottom thereof, indicating means electrically connected to said moisture detecting capacity cells, desiccant regeneration means in communication with said vessels for alternately regenerating the desiccant in one of said vessels, and valve means in said gas inlet conduit means and responsive to a signal from said moisture detecting capacity cells for alternately directing the flow of gas through the other of said vessels.

4. A multiple-unit automatic regenerative gas drying apparatus comprising two closed vessels, circulation tubes mounted within each of said vessels, the inlet and outlet ends of said tubes extending through the walls of said vessels, said circulation tubes being adapted to communicate alternately with a source of cooling fluid as a gas is being dried and a source of heating fluid for subsequent regeneration, gas inlet conduits extending through the walls of said vessels and in communication with a gas supply, gas discharge conduits extending through the walls of said vessels for discharging gas therefrom, said vessels being substantially filled with a desiccant capable of absorbing water from the gas as it flows through said vessels, baffle means affixed to said cooling tubes within each vessel for directing the flow of gas in a tortuous path through said vessel, moisture detecting capacity cells filled with said desiccant and mounted within each vessel near the top and bottom thereof, indicating means electrically connected to said moisture detecting capacity cells, desiccant regeneration means in communication with said vessels for alternately regenerating the desiccant in one of said vessels, and valve means in said gas inlet conduits and responsive to a signal from said moisture detecting capacity cells for alternately directing the flow of gas through the other of said vessels.

5. A multiple-unit automatic regenerative gas drying apparatus comprising two closed vessels, circulation tubes mounted within each of said vessels, the inlet and outlet ends of said tubes extending through the walls of said vessels, said circulation tubes being adapted to communicate alternately with a source of cooling fluid as a gas is being dried and a source of heating fluid for subsequent regeneration, gas inlet conduits extending through the walls of said vessels and in communication with a gas supply, gas discharge conduits extending through the walls of said vessels for discharging dry gas therefrom, said vessels being adapted to be substantially filled with a desiccant for absorbing water from the gas as it flows through said vessels, moisture detecting capacity cells filled with said desiccant and mounted within each vessel near the top and bottom thereof, indicating means electrically connected to said capacity cells, air heater means in communication with said gas discharge conduits of said vessels, and valve means in said gas inlet conduits and responsive to a signal from said moisture detecting capacity cells for alternately directing the flow of gas through first one and then the other of said vessels.

6. A multiple-unit automatic regenerative gas drying apparatus comprising two closed vessels, circulation tubes mounted within each of said vessels, the inlet and outlet ends of said tubes extending through the walls of said vessels, said circulation tubes being adapted to communicate alternately with a source of cooling fluid as a gas is being dried and a source of heating fluid for subsequent regeneration, gas inlet conduits extending through the walls of said vessels and in communication with a gas supply, gas discharge conduits extending through the walls of said vessels for discharging dry gas therefrom, said vessels being adapted to be substantially filled with a desiccant for absorbing water from the gas as it flows through said vessels, baffle means affixed to said cooling tubes within each vessel for directing the flow of gas in a tortuous path through said vessel, moisture detecting capacity cells filled with said desiccant and mounted within each vessel near the top and bottom thereof, indicating means electrically connected to said capacity cells, air heater means in communication with said gas discharge conduits of said vessels, and valve means in said gas inlet conduits and responsive to a signal from said moisture detecting capacity cells for alternately directing the flow of gas through first one and then the other of said vessels.

7. A multiple-unit automatic regenerative gas drying apparatus comprising two closed vessels, circulation tubes mounted within each of said vessels, the inlet and outlet ends of said tubes extending through the walls of said vessels, valve means in said circulation tubes for alternately connecting said tubes with a source of cooling fluid as a gas is being dried and a source of heating fluid for subsequent regeneration, gas inlet conduits extending through the walls of said vessels and in communication with a gas supply, gas discharge conduits extending through the walls of said vessels for discharging dry gas therefrom, said vessels being adapted to be substantially filled with a desiccant for absorbing water from the gas as it flows through said vessels, baffle means affixed to said cooling tubes within each vessel for directing the flow of gas in a tortuous path through said vessel, moisture detecting capacity cells filled with said desiccant and mounted within each vessel near the top and bottom thereof, each of said capacity cells comprising a pair of concentric electrodes with the annular space therebetween adapted to be filled with a portion of the desiccant, a pair of capacitance bridges, circuit means connecting the capacity cells of one vessel to one of the bridges and the cells of the other vessel to the other bridge, indicating means electrically connected to said capacitance bridges, air heater means in communication with said gas discharge conduits of said vessels, and valve means in said gas inlet conduits and responsive to a signal from said moisture detecting capacity cells for alternately directing the flow of air through first one and then the other of said vessels.

8. A multiple-unit automatic regenerative gas drying apparatus comprising two closed vessels, circulation tubes mounted within each of said vessels, the inlet and outlet ends of said tubes extending through the walls of said vessels, valve means in said circulation tubes for alternately connecting said tubes with a source of cooling fluid as a gas is being dried and a source of heating fluid for subsequent regeneration, gas inlet conduits extending through the walls of said vessels and in communication with a gas supply, gas discharge conduits extending through the walls of said vessels for discharging dry gas therefrom, said vessels being adapted to be substantially filled with a desiccant for absorbing water from the gas as it flows through said vessels, baffle means affixed to said cooling tubes within each vessel for directing the flow of gas in a tortuous path through said vessel, moisture detecting capacity cells filled with said desiccant and mounted within each vessel near the top and bottom thereof, each of said capacity cells comprising a pair of concentric electrodes with the annular space therebetween adapted to be filled with a portion of the desiccant, indicating means electrically connected to said capacity cells, air heater means in communication with said gas discharge conduits of said vessels, valve means in said gas inlet conduits for alternately directing the flow of gas through one of said vessels, conduit means connecting said air heater means with said vessels, valve means in said conduit means from said air heater means alternately directing the flow of air through the other of said vessels, and a power circuit connecting said valve means and responsive to a signal from said moisture detecting capacity cells whereby the valve means are actuated to channel hot air to first one vessel and then the other.

References Cited in the file of this patent
UNITED STATES PATENTS

| Number | Name | Date |
|---|---|---|
| 1,863,656 | Hartman | June 21, 1932 |
| 2,071,607 | Bjorndal | Feb. 23, 1937 |
| 2,083,732 | Moore et al. | June 15, 1937 |
| 2,328,521 | Wittman | Aug. 31, 1943 |
| 2,450,289 | Marek | Sept. 28, 1948 |
| 2,561,441 | Lou | July 24, 1951 |
| 2,623,928 | Bower | Dec. 30, 1952 |